(12) United States Patent
Morita et al.

(10) Patent No.: US 8,075,284 B2
(45) Date of Patent: Dec. 13, 2011

(54) OIL PUMP

(75) Inventors: Shoji Morita, Kanagawa (JP); Iwao Kondo, Yokohama (JP); Hideaki Ohnishi, Kanagawa (JP); Yasushi Watanabe, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 917 days.

(21) Appl. No.: 11/287,320

(22) Filed: Nov. 28, 2005

(65) Prior Publication Data

US 2006/0120896 A1 Jun. 8, 2006

(30) Foreign Application Priority Data

Nov. 29, 2004 (JP) ................................. 2004-344411

(51) Int. Cl.
*F04B 17/00* (2006.01)
*F04B 35/00* (2006.01)

(52) U.S. Cl. ..................... 417/362; 418/168; 418/171

(58) Field of Classification Search ............. 417/410.5, 417/362; 418/102, 166–171
See application file for complete search history.

(56) References Cited

U.S. PATENT DOCUMENTS

| | | | | |
|---|---|---|---|---|
| 2,242,195 A * | 5/1941 | Teker et al. | ................. | 184/11.1 |
| 3,034,447 A * | 5/1962 | Brundage | ................. | 418/73 |
| 3,198,127 A * | 8/1965 | Brundage | ................. | 418/73 |
| 3,276,676 A * | 10/1966 | Buske | ................. | 418/94 |
| 3,450,052 A * | 6/1969 | Wood et al. | ................. | 417/203 |
| 3,539,035 A * | 11/1970 | Wolkenstein | ................. | 184/6.12 |
| 3,623,829 A * | 11/1971 | Shaw et al. | ................. | 418/171 |
| 3,827,836 A * | 8/1974 | Scheibe | ................. | 418/88 |
| 4,462,350 A * | 7/1984 | Kurata | ................. | 123/196 CP |
| 4,553,915 A * | 11/1985 | Eley | ................. | 418/102 |
| 4,940,446 A * | 7/1990 | Inui et al. | ................. | 474/91 |
| 6,048,185 A * | 4/2000 | Ishizuka et al. | ................. | 418/102 |
| 6,491,010 B2 * | 12/2002 | Kawamoto et al. | ........ | 123/90.27 |
| 6,685,453 B2 * | 2/2004 | Oehman et al. | ................. | 418/102 |
| 6,761,546 B2 * | 7/2004 | Schlipf et al. | ................. | 418/102 |

FOREIGN PATENT DOCUMENTS

| | | |
|---|---|---|
| JP | 59-146591 U | 9/1984 |
| JP | 09-329093 A | 12/1997 |
| JP | 10-205317 A | 8/1998 |
| JP | 2003-239869 A | 8/2003 |

OTHER PUBLICATIONS

Partial English Translation of Japanese Patent Publication Nos. 10-205317 and 9-329093.

* cited by examiner

*Primary Examiner* — Devon C Kramer
*Assistant Examiner* — Amene Bayou
(74) *Attorney, Agent, or Firm* — Foley & Lardner LLP

(57) ABSTRACT

An oil pump includes a shaft bearing bore, a drive shaft supported by the shaft bearing bore, an annular space between an inner peripheral surface of the shaft bearing bore and an outer peripheral surface of the drive shaft, a communication passage portion formed on the side of a pumping chamber inside the shaft bearing bore, and a communication groove formed opposite to the communication passage portion inside the shaft bearing bore. The communication passage portion is communicated between a discharge port and the annular space, and the communication groove is communicated with the annular space. Oil is stored in the annular space from the discharge port via the communication passage portion, and the oil flows into sliding clearance spaces of first and second journal portions via the annular space and the communication passage portion and the communication groove.

17 Claims, 5 Drawing Sheets

OIL PUMP

CROSS-REFERENCE TO RELATED APPLICATIONS

This application is based on a prior Japanese Patent Application No. 2004-344411 filed on Nov. 29, 2004. The entire contents of this Japanese Patent Application No. 2004-344411 are hereby incorporated by reference.

BACKGROUND OF THE INVENTION

The present invention relates to an oil pump which supplies lubricating oil to each part of sliding portions in a piston, a valve system, or the like for an internal combustion engine etc., and more specially, to an oil pump which is capable of improving lubricity.

In recent years, there have been proposed and developed various oil pumps, such as a trochoid pump generally known and used, for lubrication of engine. One such oil pump for lubrication of engine has been disclosed in Japanese Patent Provisional Publication No. 2003-239869 (hereinafter is referred to as "JP2003-239869").

The oil pump disclosed in JP2003-239869 comprises a pump housing, an working chamber formed in the pump housing, an outer rotor with a plurality of internal teeth integrally formed with the inner circumference thereof, which is rotatably housed in the working chamber, an inner rotor with a plurality of external teeth integrally formed with the outer circumference thereof and meshing with the internal teeth of the outer rotor, which is rotatably housed in the working chamber, and a drive shaft rotating and driving the inner rotor, which is rotatably housed in the pump housing.

As the inner rotor turns via the drive shaft, the outer rotor also turns in response. And then, the volume of a pumping chamber formed by the mesh of the internal and external teeth varies, it forces oil to flow from a suction port into the pumping chamber, and to flow toward a discharge port. Thus, this oil pump works as a pump supplying lubricating oil to each part of sliding portions in an internal combustion engine.

The drive shaft is rotatably supported on an inner peripheral surface of a journal formed in the pump housing. Between the drive shaft and the journal, a first groove and a second groove are provided. The first groove has its one end communicating with the discharge port and the other end reaching the halfway of the journal. The second groove has its one end communicating with the outside of the pump housing and the other end finished in the halfway of the journal.

These first and second grooves are arranged so that both of the grooves are spaced apart from each other, and a part of each the groove is overlapped to each other in the groove extending direction.

Accordingly, when the engine starts, air which has accumulated in the discharge port is discharged rapidly. Additionally, during operation of lubricating, oil having flowed out or spilled out from the discharge port flows into the first groove, and further flows into the second groove from the first groove through a sliding clearance space between an outer peripheral surface of the drive shaft and the inner peripheral surface of the journal. Simultaneously, the sliding clearance space between the outer peripheral surface of the drive shaft and the inner peripheral surface of the journal is lubricated by way of the above oil flow.

SUMMARY OF THE INVENTION

With the above-mentioned oil pump for supplying the lubricating oil in JP2003-239869, during operation of lubricating, the oil pump is capable of supplying oil rapidly into the first groove communicating with the discharge port. However, both of the first and second grooves are not communicated with each other but mutually separated in order to release the air rather than to lubricate the sliding clearance space. The first groove extends slenderly in the direction of the drive shaft and the cross sectional area thereof is small, so that the first groove becomes incapable of filling or storing sufficient oil for lubricating. Therefore, there is a possibility that lubricity of the sliding clearance space between the outer peripheral surface of the drive shaft and the inner peripheral surface of the journal will deteriorate.

Further, as for the second groove, only a slight amount of the oil which has leaked out from the sliding clearance space between the outer peripheral surface of the drive shaft and the inner peripheral surface of the journal is supplied into the second groove. Thus, lubricity of a sliding clearance space between an outer end side of the journal and the drive shaft will also deteriorate.

And furthermore, aforementioned deterioration of lubricity of the sliding clearance space between the journal and the drive shaft is specially apt to occur when the flow amount of discharge is small, such as the engine startup. It will reduce efficiency of providing or supplying the lubricating oil to each part of a sliding portions in the engine.

Accordingly, it is an object of the present invention to provide an oil pump, which is capable of supplying the lubricating oil for the internal combustion engine etc. with efficiency and avoids aforementioned deterioration of lubricity of the sliding clearance space between the journal and the drive shaft.

According to one aspect of the present invention, an oil pump comprises a pump housing having a shaft bearing bore, a pumping chamber, inlet and discharge ports, all provided in the pump housing, a drive shaft rotatably supported on the shaft bearing bore, for discharging working fluid, which is pressurized within the pumping chamber by way of rotary motion of the drive shaft, through the discharge port, the pump housing and the drive shaft cooperating with each other for defining therebetween first and second journal portions, the first journal portion being located at a first housing end of two opposing ends of the pump housing for rotatably supporting one axial end of the drive shaft, and the second journal portion being located at the second housing end of the pump housing for rotatably supporting the other axial end of the drive shaft facing the pumping chamber, the pump housing and the drive shaft cooperating with each other for defining an annular space between the first and second journal portions and a communication passage portion located in the second journal portion for intercommunicating the annular space and the discharge port on a side of the second journal portion.

According to another aspect of the invention, an oil pump comprises a pump housing having a shaft bearing bore, a pumping chamber, inlet and discharge ports, all provided in the pump housing, a drive shaft adapted to be rotated by a driving source, and rotatably supported on the shaft bearing bore, a pump assembly housed in the pump housing, for discharging working fluid, which is pressurized within the pumping chamber by way of rotary motion of the drive shaft, through the discharge port, the pump housing and the drive shaft cooperating with each other for defining therebetween at least three journal portions including a first axial-end journal portion, a second axial-end journal portion and an intermediate journal portion, the first axial-end journal portion being located at a first housing end of two opposing ends of the pump housing for rotatably supporting one axial end of the drive shaft, the second axial-end journal portion being located at the second housing end of the pump housing for rotatably supporting the other axial end of the drive shaft facing the pumping chamber, and the intermediate journal portion being located between the first and second axial-end journal portions for rotatably supporting an intermediate portion of the drive shaft, and the pump housing and the drive shaft cooperating with each other for defining at least two annular spaces among the first and second axial-end journal portions and the intermediate journal portion.

According to a further aspect of the invention, an oil pump comprises a pump housing having a shaft bearing bore, a pumping chamber, inlet and discharge ports, all provided in the pump housing, a drive shaft adapted to be rotated by a driving source, and rotatably supported on the shaft bearing bore, a pump assembly housed in the pump housing, for discharging working fluid, which is pressurized within the pumping chamber by way of rotary motion of the drive shaft, through the discharge port, the pump housing and the drive shaft cooperating with each other for defining therebetween first and second journal portions, the first journal portion being located at a first housing end of two opposing ends of the pump housing for rotatably supporting one axial end of the drive shaft, and the second journal portion being located at the second housing end of the pump housing for rotatably supporting the other axial end of the drive shaft facing the pumping chamber, the pump housing and the drive shaft cooperating with each other for defining an annular space between the first and second journal portions, and a cross-sectional area of a clearance space of the second journal portion and defined between the drive shaft and the shaft bearing bore, which intercommunicates the discharge port and the annular space, being dimensioned to be greater than a cross-sectional area of a clearance space of the first journal portion and defined between the drive shaft and the shaft bearing bore, which intercommunicates the annular space and an exterior space of the pump housing.

The other objects and features of this invention will become understood from the following description with reference to the accompanying drawings.

DETAILED DESCRIPTION OF THE INVENTION

The present invention will be explained below with reference to the drawings. In the following description, each of the oil pumps of the embodiments below is placed in an oil pan in the internal combustion engine and apply to the trochoid pump which supplies lubricating oil or working fluid to each part of the sliding portions in the internal combustion engine.

Figure 1:
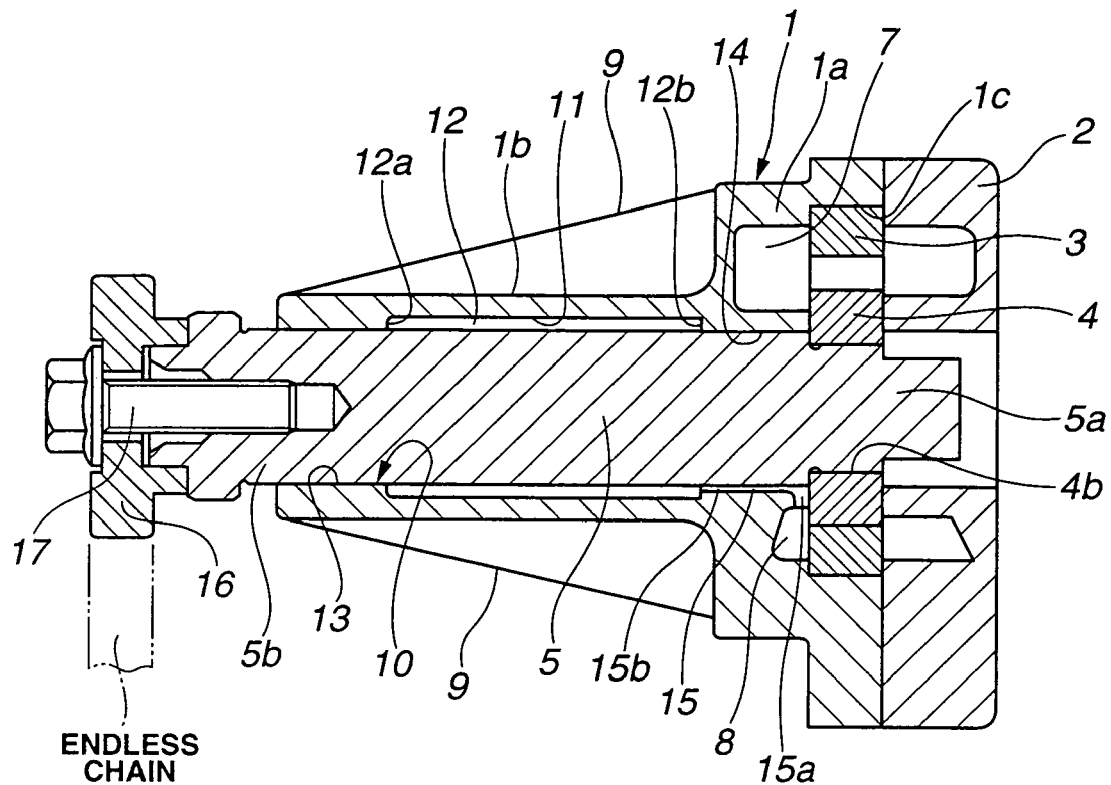
FIG. 1 is a sectional view of an oil pump taken along a line I-I of FIG. 3 in accordance with a first embodiment of the present invention.
Figure 2:
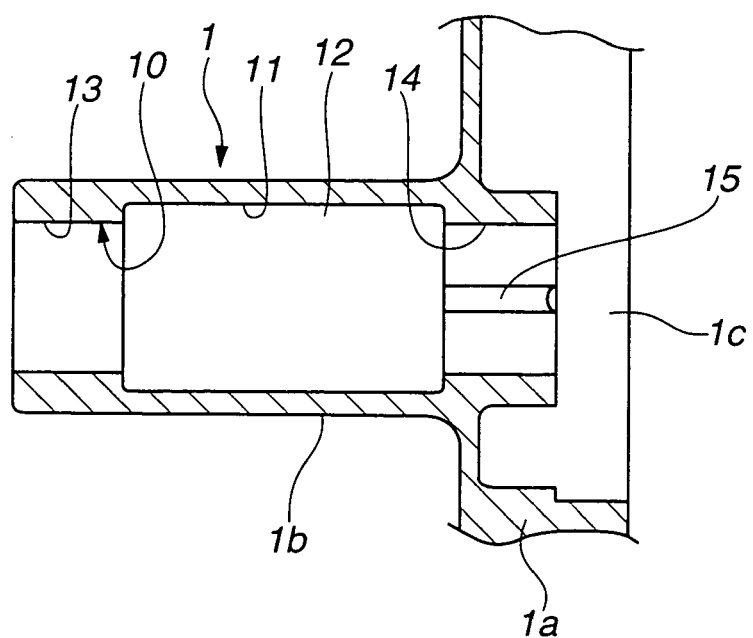
FIG. 2 is a longitudinal section view of a main part of an oil pump housing in accordance with the first embodiment.
Figure 3:
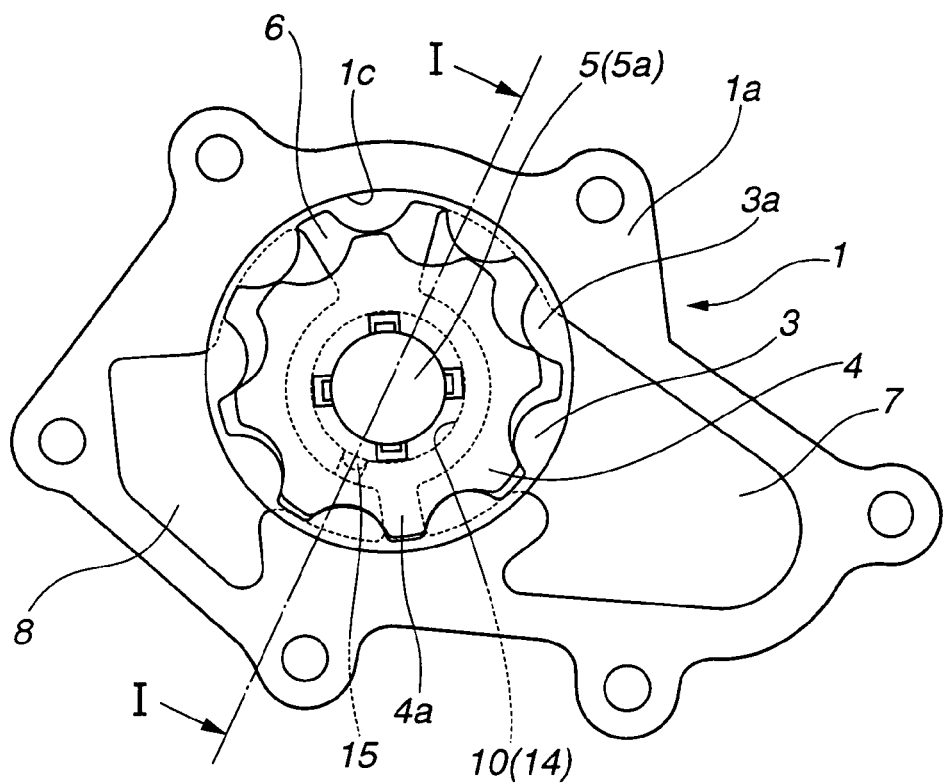
FIG. 3 is a front view of the oil pump without a cover member in accordance with the first embodiment.
Figure 4:
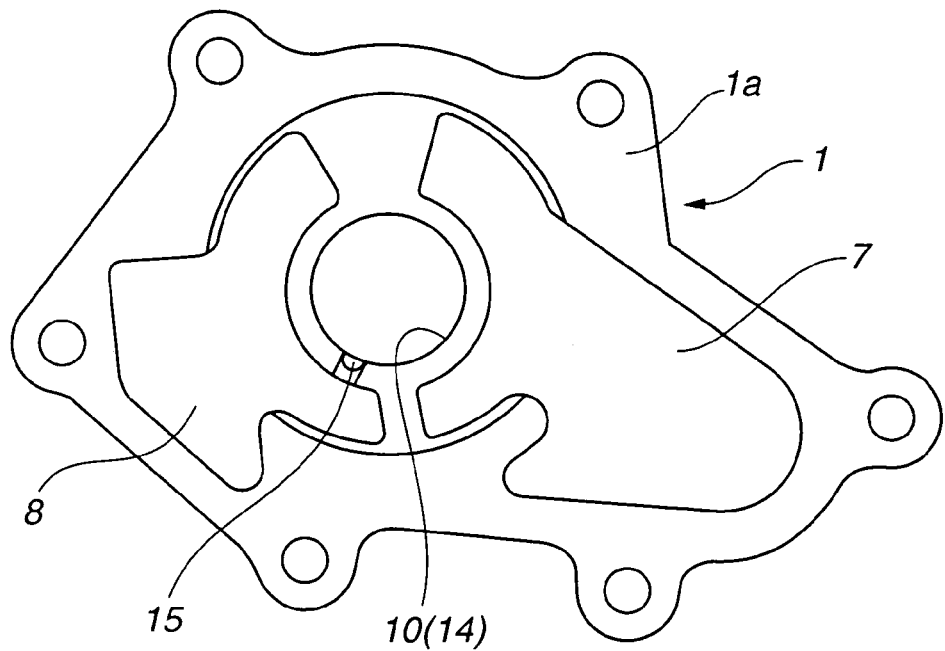
FIG. 4 is a front view of the oil pump in accordance with the first embodiment.

Firstly, referring now to FIGS. 1 to 4, there are shown an oil pump in accordance with the first embodiment. As shown in FIG. 1, the oil pump comprises a pump housing 1 made of aluminum alloy etc., a cover member 2 closing one end of pump housing 1, a ring-shaped working chamber 1c formed inside pump housing 1, an outer rotor 3 having a plurality of internal teeth 3a (or inner toothed portion 3a) integrally formed with an inner circumference thereof in the circumferential direction, which is rotatably housed in working chamber 1c, an inner rotor 4 having a plurality of external teeth 4a (or outer toothed portion 4a) integrally formed with an outer circumference thereof in the circumferential direction and meshing with internal teeth 3a of outer rotor 3, which is rotatably housed on an inner circumferential side of outer rotor 3 in working chamber 1c, a drive shaft 5 rotating and driving inner rotor 4 in one direction, which is rotatably housed in pump housing 1, and a plurality of pumping chambers 6 formed between internal and external teeth 3a, 4a by their mesh. As can be seen in FIG. 3, a closing portion where the volume of pumping chamber 6 becomes maximum and a meshing portion where pumping chamber 6 becomes minimum are defined respectively. And there are a suction port 7 (or an inlet port 7) and a discharge port 8, which are substantially symmetric with respect to a line between the closing portion and the meshing portion.

Pump housing 1, which is formed in a stepped cylindrical shape outwardly, is composed of a large diameter ring-shaped pump body 1a on the side of cover member 2 and a small diameter cylindrical portion 1b (or axially-extending cylindrical housing portion 1b) integrally formed with the side of pump body 1a. Working chamber 1c is formed inside pump body 1a, suction port 7 and discharge port 8 are formed between pump body 1a and cover member 2 respectively.

A plurality of stiffening ribs 9 (or stiffening member 9) are provided on an outer peripheral surface of cylindrical portion 1b. One end of each of stiffening ribs 9 is integrally attached or connected to a rear-end surface of pump body 1a, the other end of each of stiffening ribs 9 extends up to the end of cylindrical portion 1b and is integrally attached or connected to the outer peripheral surface of cylindrical portion 1b.

A journal 10 (or a shaft bearing bore 10), which penetrates the inside of pump housing 1 in the axial direction, is formed in pump housing 1 so as to rotatably support drive shaft 5.

More specifically, journal 10 penetrates from the middle of the inside of pump body 1a to the end of the inside of cylindrical portion 1b. The bore diameter of journal 10 is slightly greater than the major diameter of drive shaft 5. A cylindrical groove 11 is bored by way of machining, and then formed on an inner peripheral surface of journal 10. A cylindrical or annular space 12 is formed between an inner peripheral surface of cylindrical groove 11 and an outer peripheral surface of drive shaft 5. A first journal portion 13 is formed near the end of the inside of cylindrical portion 1b in journal 10 (that is, on the left side of annular space 12 in journal 10 in FIGS. 1 and 2), and a second journal portion 14 is formed on the side of pump body 1a (that is, on the opposite side to first journal portion 13. In FIGS. 1 and 2, on the right side of annular space 12 in journal 10).

Cylindrical groove 11, that is, annular space 12 is formed in a predetermined axial length, and substantially centrally located in the axial direction of journal 10. Therefore, the total volume of annular space 12 becomes relatively large. Additionally, first and second journal portions 13, 14 become substantially identical in length in the axial direction. Cylindrical groove 11 is formed in a relatively shallow depth so as not to deteriorate stiffness of cylindrical portion 1b greatly.

As shown in FIGS. 1 and 2, annular space 12 communicates with discharge port 8 via a communication passage portion (hereinafter referred to as "an oil groove 15"). Oil groove 15 is substantially L-shaped, and is continuously formed from the side of annular space 12 to the side of working chamber 1c on the inner peripheral surface of second journal portion 14 by way of boring or cutting out.

More specially, oil groove 15 has a radial groove portion 15a communicated with discharge port 8 on the side of working chamber 1c, and an axial groove portion 15b communicated with annular space 12 on the inner peripheral surface of second journal portion 14. Axial groove portion 15b is continuously and gradually widened toward working chamber 1c from the side of annular space 12 (cylindrical groove 11) in order that a cast (pump housing 1) is able to be easily taken from a mold after casting in the making of pump housing 1 (In FIGS. 1 and 2, axial groove portion 15b is not widened, however, the actual axial groove portion 15b is widened).

With regard to position of oil groove 15, it is desirable that oil groove 15 is placed or located at the portion which is unaffected by turning moment from an endless chain (described later) on the inner peripheral surface of second journal portion 14.

Cover member 2 is fixedly connected onto a front-end surface of pump body 1a with bolts (not shown).

Drive shaft 5 has a first axial end 5a thereof on the side of cover member 2 and a second axial end 5b thereof on the opposite side. First axial end 5a of drive shaft 5 faces working chamber 1c and engages with a hole 4b of inner rotor 4 by way of spline connection, and then rotates and drives inner rotor 4. On the other hand, on the side of second axial end 5b, a driven sprocket 16 (or a chain-driven sprocket 16) with the endless chain is fixed to drive shaft 5 with a bolt 17. Drive shaft 5 is supported by both of first journal portion 13 on the side of second axial end 5b and second journal portion 14 on the side of the first axial end 5a, so that drive shaft 5 is rotated or turned by turning torque from crankshaft of an engine (not shown) via driven sprocket 16 with the endless chain.

As discussed above, with aforementioned oil pump, as drive shaft 5 rotates after the engine has started, inner rotor 4 and outer rotor 3 also rotate in response and act as a pump. Even during the early stage of engine startup in which the engine has not yet been started completely, oil in discharge port 8 is supplied into second journal portion 14 and annular space 12 via oil groove 15. And further, the oil is also supplied into first journal portion 13, even though another oil groove is not provided on the side thereof.

That is to say, annular space 12 is cylindrical or annular in shape, so that the volume thereof becomes large and sufficient oil for lubricating is able to be filled or stored in annular space 12. The oil in annular space 12 flows or spills out of each side 12a and 12b of annular space 12, and flows or spills onto each inner peripheral surface of first and second journal portions 13, 14. Accordingly, it becomes capable of improving lubricity of a sliding clearance space between an outer peripheral surface of drive shaft 5 and each inner peripheral surface of first and second journal portions 13, 14 together with each side 12a, 12b of annular space 12.

And further, because of providing annular space 12, surface-to-surface contact between drive shaft 5 and journal 10 at annular space 12 becomes free, that is, frictional resistance between the above surfaces decreases. It therefore leads to enhancement of rotatability of drive shaft 5.

Furthermore, cylindrical groove 11 is provided not on the outer peripheral surface of drive shaft 5 but on the inner peripheral surface of journal 10 in pump housing 1. It therefore becomes capable of keeping high stiffness of drive shaft 5.

The oil pump structure of the first embodiment can produce advantageous effects as described above. In addition to that, a modified example will be explained below (figure is not illustrated). With regard to the bore diameter of journal 10, it can be modified. For instance, the bore diameter of journal 10 at second journal portion 14 is modified so that it becomes slightly greater than that of journal 10 at first journal portion 13. In other words, the cross sectional area of the sliding clearance space between the outer peripheral surface of drive shaft 5 and the inner peripheral surface of second journal portion 14 is enlarged. This brings about the increase of the volume of oil which flows out or spills out from discharge port 8 to annular space 12. Even if oil groove 15 is not provided, more oil flows or spills to annular space 12, and the oil is able to be stored or filled in annular space 12. On the other hand, the cross sectional area of the sliding clearance space between an outer peripheral surface of drive shaft 5 and inner peripheral surface of first journal portion 13 is not able to be enlarged. If so, the oil which is supplied into first journal portion 13 will easily leak out to the exterior space of pump housing 1. As discussed above, this modified example has substantially the same effects as the first embodiment as well.

Figure 5:
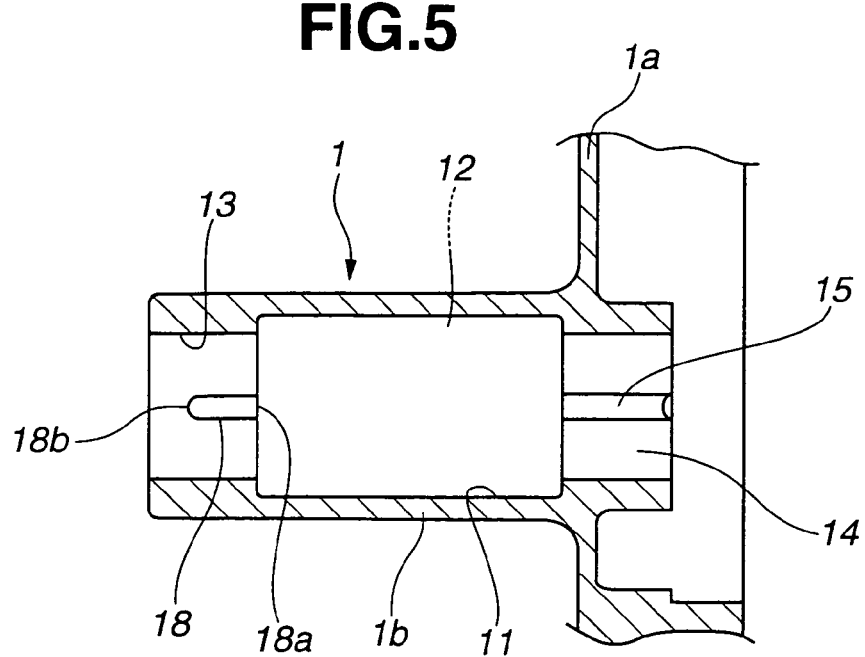
FIG. 5 is a longitudinal section view of a main part of an oil pump housing in accordance with a second embodiment.

Next, the oil pump structure of the second embodiment will be explained with reference to FIG. 5. The oil pump of the second embodiment is structurally similar to that of the first embodiment, except that a communication groove 18 is provided on the inner peripheral surface of first journal portion 13 in this embodiment. Communication groove 18 is formed slenderly on the opposite side to oil groove 15, and is arranged substantially in line with oil groove 15 in the same direction as oil groove 15. Further, communication groove 18 communicates with annular space 12, that is, one end 18a thereof reaches the left side of cylindrical groove 11 in FIG. 5 (that is, one end 18a completely communicates with cylindrical groove 11.) On the other hand, the other end 18b thereof extends up to the portion where the length from the left side of cylindrical groove 11 in the axial direction is substantially two thirds of first journal portion 13, and closes contrary to one end 18a of communication groove 18.

Accordingly, oil filled or stored in annular space 12 via oil groove 15 is supplied into communication groove 18 directly. And then, both of the oil from communication groove 18 and the oil from the side 12a of annular space 12 flow or spill into the inside of first journal portion 13 fully and rapidly. Thus, it becomes possible to further improve lubricity of the sliding clearance space of first journal portion 13 compared with the first embodiment.

In addition, since the other end 18b of communication groove 18 does not reach the end of first journal portion 13 (that is, the other end 18b closes), the excess oil from annular space 12 is stopped hereupon. Because of this, it does not influence discharge efficiency of oil pump.

With regard to shape or direction of communication groove 18, it is not necessarily formed in the axial direction as described above. Alternatively, the following modifications are also possible. For instance, oil groove 18 is helical or spiral or angled or leaned in shape. However, any second oil groove including the above modifications has to have the end thereof which does not reach the end of first journal portion 13, and closes.

Figure 6:
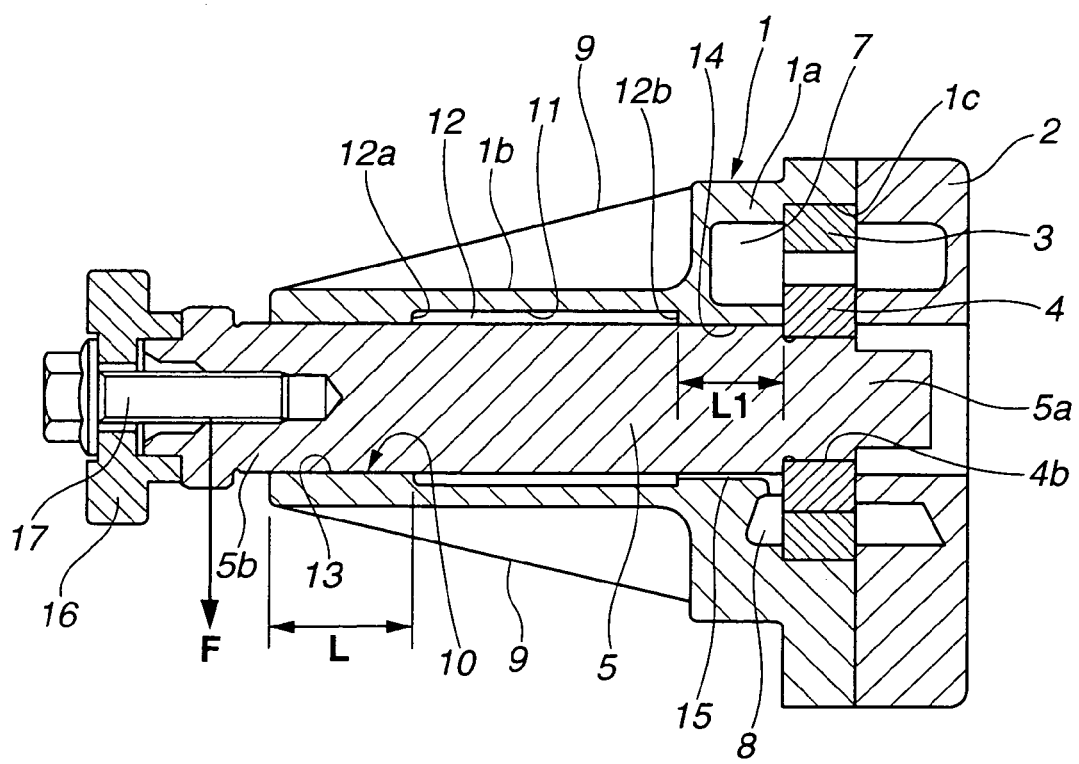
FIG. 6 is a sectional view of an oil pump in accordance with a third embodiment.

The oil pump structure of the third embodiment will be explained with reference to FIG. 6. The oil pump of the third embodiment is structurally similar to that of the first embodiment, except for the placement of cylindrical groove 11 and an axial length of first journal portion 13. Cylindrical groove 11 is shifted toward second journal portion 14. The axial length of first journal portion 13 (hereinafter referred to as "L") is set or dimensioned so that L is longer than that of second journal portion 14 (hereinafter referred to as "L1").

Although driving torque is transmitted from the crankshaft via driven sprocket 16 with the endless chain to drive shaft 5, as the driving torque is transmitted, rotation moment or turning moment may produce under radial tension (in the direction of the arrow in FIG. 6) on the side of second axial end 5b of drive shaft 5. Thus, a portion of the above L of first journal portion 13 will have to receive or support the large rotation moment or turning moment of drive shaft 5.

For this purpose, the axial length L of first journal portion 13 is set to a large length. Therefore, the stiffness of first journal portion 13 can be improved, and first journal portion 13 is able to support drive shaft 5 with stability.

Figure 7:
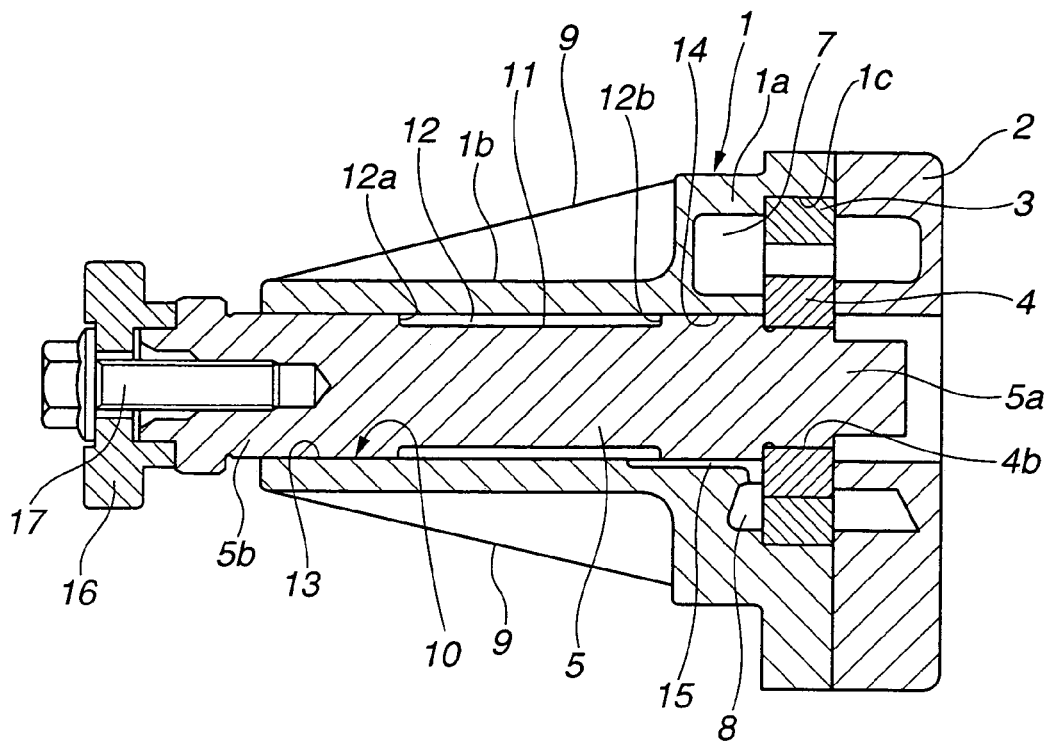
FIG. 7 is a sectional view of an oil pump in accordance with a fourth embodiment.

The oil pump structure of the fourth embodiment will be explained with reference to FIG. 7. The oil pump of the fourth embodiment is structurally similar to that of the first embodiment, except for cylindrical groove 11 which is formed on the inner peripheral surface of journal 10 in the first embodiment. In the fourth embodiment, instead, a cylindrical groove 11 is formed on the outer peripheral surface of drive shaft 5 inside cylindrical portion 1b of pump housing 1. Thus, annular space 12 is formed between the outer peripheral surface of cylindrical groove 11 and the inner peripheral surface of journal 10. Simultaneously, first and second journal portion 13, 14 are formed at rear and front of annular space 12 respectively.

Because of forming cylindrical groove 11 on the outer peripheral surface of drive shaft 5, its formation or machining process becomes easier than that of the first embodiment, which is formed on the inner peripheral surface of journal 10.

Figure 8:
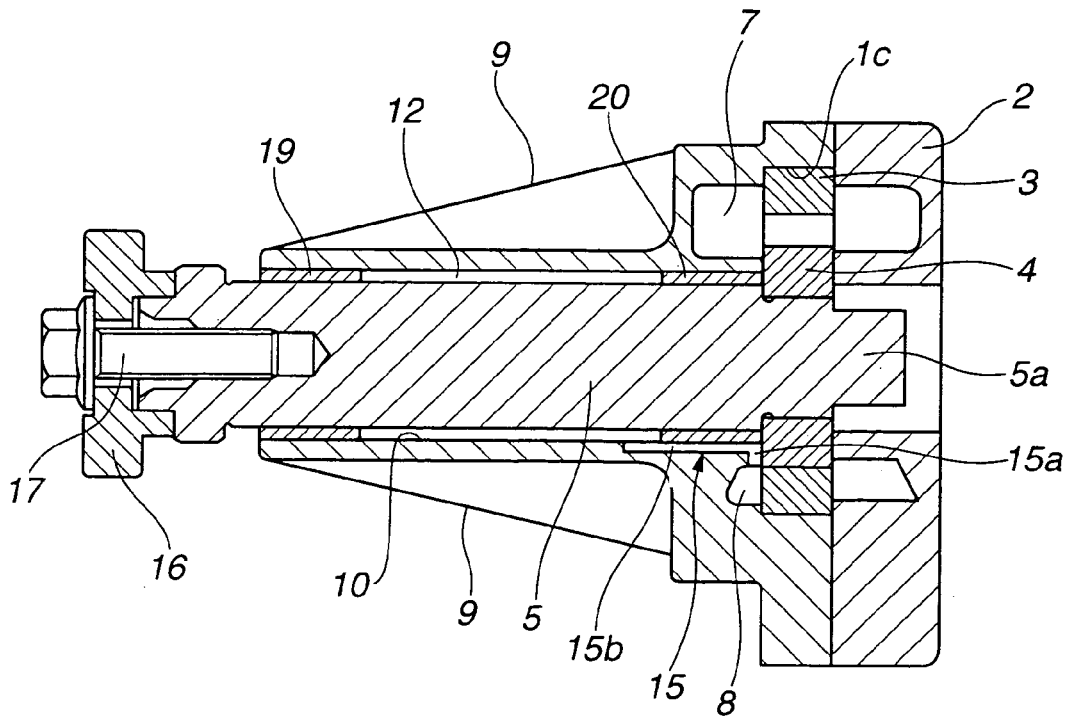
FIG. 8 is a sectional view of an oil pump in accordance with a fifth embodiment.

The oil pump structure of the fifth embodiment will be explained with reference to FIG. 8. The oil pump of the fifth embodiment is structurally similar to that of the first embodiment, except for first and second journal portions 13, 14 and oil groove 15 in the first embodiment. In the fifth embodiment, instead of first and second journal portions 13, 14, first and second bearing bearing bushes 19, 20 made of synthetic resin or the like are provided respectively hereupon, and support drive shaft 5 on the inner peripheral surface thereof.

Concretely, both of the first and second bearing bearing bushes 19, 20 are substantially cylindrical in shape, and substantially equal in length each other. More specially, first and second bearing bearing bushes 19, 20 are press-fitted in the rear and front end portion of journal 10, whose bore diameter is slightly greater than that of the first embodiment, and are located or spaced apart from each other at a predetermined axial distance. So, by way of providing both first and second bearing bearing bushes 19, 20, annular space 12 is necessarily formed between first and second bearing bearing bushes 19, 20 inside journal 10. That is, annular space 12 is defined by both first and second bearing bearing bushes 19, 20.

As for oil groove 15, in the same manner as the first embodiment, radial groove portion 15a of oil groove 15 is communicated with discharge port 8 on the side of working chamber 1c. On the other hand, axial groove portion 15b of oil groove 15 is formed on the inner peripheral surface of journal 10 outside the outer peripheral surface of second bearing bush 20 so as to communicate with annular space 12, as can be seen in FIG. 8.

As discussed above, in the fifth embodiment, this makes it possible to form portions which support drive shaft 5 instead of first and second journal portions 13, 14 in the first embodiment, by way of only providing both first and second bearing bushes 19, 20 between the inner peripheral surface of journal 10 and the outer peripheral surface of drive shaft 5. Thus, a metalworking process for annular space 12 on the surface of journal 10 or drive shaft 5 is not needed. This therefore brings about facilitation of its assembly processing.

In addition, axial groove portion 15b of oil groove 15 is formed not on the outer peripheral surface of second bearing bush 20 but on the inner peripheral surface of journal 10, so that they can be used in common with each other.

Figure 9:
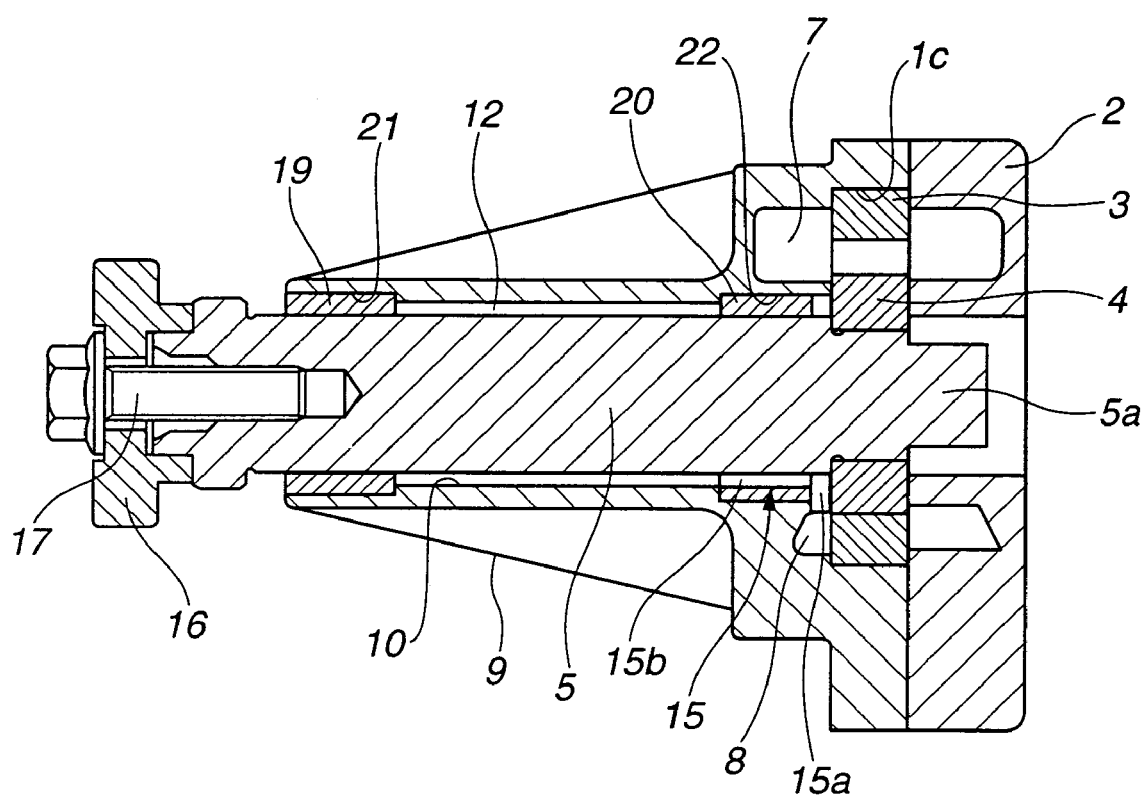
FIG. 9 is a sectional view of an oil pump in accordance with a sixth embodiment.

The oil pump structure of the sixth embodiment will be explained with reference to FIG. 9. The oil pump of the sixth embodiment is structurally similar to that of the fifth embodiment, except for cylindrical-shaped first and second bush-retaining grooves 21, 22 provided on the inner peripheral surface of the rear and front end portion of journal 10, and oil groove 15 in this embodiment.

First and second bush-retaining grooves 21, 22 are formed in order for holding first and second bearing bushes 19, 20. That is, each of first and second bearing bushes 19, 20 fits into each of first and second bush-retaining grooves 21, 22 respectively. It results in ensuring the stability and the locating of first and second bearing bushes 19, 20.

As for oil groove 15, instead of axial groove portion 15b of oil groove 15, a notch groove is formed on the inner peripheral surface of second bearing bush 20 in the axial direction by way of boring or cutting out so as to communicate between radial groove portion 15a of oil groove 15 and the side of annular space 12.

And thus, by way of the notch groove formed on the inner peripheral surface of second bearing bush 20, a metalworking process for axial groove portion 15b on the inner peripheral surface of journal 10 is not needed. It therefore results in facilitation of its assembly processing.

The above embodiments can produce advantageous effects as described above. In addition to that, a modified example having substantially the same effects as the above embodiments will be explained below (figure is not illustrated).

In the above embodiments, one annular space 12 is provided inside cylindrical portion 1b. However, if cylindrical portion 1b is relatively very long, annular space 12 will have to be enlarged in the axial direction. In the case of this, there is a possibility that the stiffness of cylindrical portion 1b will deteriorate. For this reason, annular space 12 may be separated or divided into two or more annular spaces 12 in the axial direction. In this case, a plurality of annular spaces 12 is formed between journal 10 and drive shaft 5 inside cylindrical portion 1b. Simultaneously, there remain a plurality of inner walls between the above annular spaces 12. (These portions where there remain a plurality of inner walls become intermediate journal portions) Thus, deterioration of stiffness of cylindrical portion 1b can be prevented. Oil having flowed out or spilled out from discharge port 8 flows into the closest annular space 12 to discharge port 8 first. Thereafter, the oil gradually flows into each of annular spaces 12. And then, the oil is stored or filled in each of annular spaces 12, even if oil groove 15 is not provided. Thereafter, the oil flows into the sliding clearance space of first journal portion 13, and both of the sliding clearance spaces of first and second journal portions 13, 14 can be lubricated.

Although the above embodiments of the invention are described mainly about conformation of the journal on one side of the drive shaft, these can be applied to conformation of a journal on both sides of the drive shaft as well. And the oil pump is also used as a hydraulic source of hydraulic brake systems or power steering systems.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An oil pump comprising:
a pump housing having a shaft bearing bore, a pumping chamber, an inlet port and a discharge port, all provided in the pump housing;
a drive shaft rotatably supported on the shaft bearing bore and connected with meshed pump rotors, for discharging working fluid, which is pressurized within the pumping chamber by way of rotary motion of the drive shaft, through the discharge port, the pump housing and the drive shaft cooperating with each other for defining therebetween first and second journal portions, the first journal portion being located at a first end of two opposing ends of the pump housing for rotatably supporting one axial end of the drive shaft, the second journal portion being located at the second end of the pump housing for rotatably supporting the other axial end of the drive shaft facing the pumping chamber, and the first and second journal portions being positioned at one side of the pump rotors, an inner peripheral surface of the pump housing and an outer peripheral surface of the drive shaft cooperating with each other for defining an annular space between the first and second journal portions in an axial direction of the drive shaft;
a communication passage portion located in the second journal portion for intercommunicating the annular space and the discharge port on a side of the second journal portion, the pump housing being provided with a cylindrical portion that is integrally formed with the pump housing, and the shaft bearing bore penetrating the pump housing and being formed at the cylindrical portion; and
a plurality of ribs whose one end is connected to the pumping chamber side of the pump housing and whose other end extends up to an end side of the cylindrical portion being integrally provided on an outer peripheral surface of the cylindrical portion,
wherein the drive shaft is provided with a chain-driven sprocket to which a turning torque is transmitted through an endless chain,
wherein the ribs longitudinally extend in an overlapping manner with a longitudinal axis of the annular space, and
wherein oil is provided and stored in the annular space and oil is provided to each journal portion from an entire circumference direction of the annular space.

2. The oil pump as claimed in claim 1, wherein:
the first and second journal portions and the annular space are formed on an inner peripheral surface of the shaft bearing bore.

3. The oil pump as claimed in claim 1, wherein:
the first and second journal portions-arc formed on an inner peripheral surface of the shaft bearing bore, and the annular space is formed on the outer peripheral surface of the drive shaft.

4. The oil pump as claimed in claim 1, wherein:
the first journal portion has a portion defining a communication groove communicating with the annular space and formed on an inner peripheral surface of the first journal portion from the annular space substantially up to a midpoint of an entire axial length of the first journal portion.

5. The oil pump as claimed in claim 1, wherein:
the first journal portion comprises a first bearing bush; and
the second journal portion comprises a second bearing bush.

6. The oil pump as claimed in claim 5, wherein:
the first and second bearing bushes are disposed between an inner peripheral surface of the shaft bearing bore and the outer peripheral surface of the drive shaft and spaced apart from each other by a predetermined axial distance for defining the annular space between the first and second bearing bushes.

7. The oil pump as claimed in claim 5, wherein:
the pump housing has a substantially annular, first bush-retaining groove fanned on an inner peripheral surface of the shaft bearing bore and located at the first end of the housing, and a substantially annular, second bush-retaining groove formed on the inner peripheral surface of the shaft bearing bore and located at the second end of the housing, for press-fitting the first bearing bush into the first bush-retaining groove and for press-fitting the second bearing bush into the second bush-retaining groove.

8. The oil pump as claimed in claim 5, wherein:
the communication passage portion is formed on an inner peripheral surface of the second bearing bush for communicating the discharge port with the annular space through the communication passage portion.

9. The oil pump as claimed in claim 5, wherein:
the communication passage portion is formed on an inner peripheral surface of the shaft bearing bore.

10. The oil pump as claimed in claim 1, wherein:
an axial length of the first journal portion is dimensioned to be greater than an axial length of the second journal portion.

11. The oil pump as claimed in claim 1, wherein:
the meshed pump rotors comprise:
an outer rotor rotatably accommodated in a substantially annular working chamber defined in the pump housing and having an inner toothed portion formed on an inner periphery of the outer rotor; and
an inner rotor rotatably housed inside the outer rotor and having an outer toothed portion formed on an outer periphery of the inner rotor and in meshed-engagement with the inner toothed portion of the outer rotor, the inner rotor being driven by the drive shaft; and
the inner toothed portion of the outer rotor and the outer toothed portion of the inner rotor, in meshed-engagement, cooperate with each other for defining therebetween a plurality of pumping chambers communicating with each of the inlet and discharge ports.

12. The oil pump as claimed in claim 1, wherein:
the pump housing comprises a cover member hermetically covering an opening end of the pump housing.

13. The oil pump as claimed in claim 1, wherein:
the pump housing is made of aluminum alloy.

14. The oil pump as claimed in claim 1, wherein:
the communication passage portion is formed at a part of the second journal portion that is unaffected by a moment of force input from the chain and acting on an inner peripheral surface of the second journal portion.

15. The oil pump as claimed in claim 1, wherein:
the first and second journal portions are formed by the shaft bearing bore penetrating an inside of the pump housing,
the first journal portion includes no oil groove on the inner peripheral surface thereof and the second journal portion includes an oil groove on an inner peripheral surface thereof, and
the oil groove forms the communication passage portion.

16. The oil pump as claimed in claim 1, wherein:
flow of the oil provided in the annular space at the first journal portion side is stopped by the first journal portion.

17. An oil pump comprising:
a pump housing having a shaft bearing bore, a pumping chamber, an inlet port and a discharge port, all provided in the pump housing;
a drive shaft adapted to be rotated by a driving source, and rotatably supported on the shaft bearing bore;
a pump assembly housed in the pump housing, for discharging working fluid, which is pressurized within the pumping chamber by way of rotary motion of the drive shaft, through the discharge port, the pump housing and the drive shaft cooperating with each other for defining therebetween first and second journal portions, the first journal portion being located at a first end of two opposing ends of the pump housing for rotatably supporting one axial end of the drive shaft, and the second journal portion being located at the second end of the pump housing for rotatably supporting the other axial end of the drive shaft facing the pumping chamber, the pump housing and the drive shaft cooperating with each other for defining an annular space between the first and second journal portions;
a cross-sectional area of a clearance space of the second journal portion that intercommunicates the discharge port and the annular space is defined between the drive shaft and the shaft bearing bore, and is dimensioned to be greater than a cross-sectional area of a clearance space of the first journal portion that is defined between the drive shaft and the shaft bearing bore and that intercommunicates the annular space and an exterior space of the pump housing, the pump housing being provided with a cylindrical portion that is integrally fanned with the pump housing, and the shaft bearing bore penetrating the pump housing and being formed at the cylindrical portion; and
a plurality of ribs whose one end is connected to the pumping chamber side of the pump housing and whose other end extends up to an end side of the cylindrical portion being integrally provided on an outer peripheral surface of the cylindrical portion,
wherein the drive shaft is provided with a chain-driven sprocket to which a turning torque is transmitted through an endless chain, and
wherein the ribs longitudinally extend in an overlapping manner with a longitudinal axis of the annular space.

\* \* \* \* \*